(12) United States Patent
Sue et al.

(10) Patent No.: US 9,321,919 B2
(45) Date of Patent: Apr. 26, 2016

(54) SURFACE-MODIFIED, EXFOLIATED NANOPLATELETS AS MESOMORPHIC STRUCTURES IN SOLUTIONS AND POLYMERIC MATRICES

(71) Applicants: The Texas A&M University System, College Station, TX (US); Kaneka Corporation, Osaka (JP)

(72) Inventors: Hung-Jue Sue, College Station, TX (US); Minhao Wong, College Station, TX (US); Peng Li, College Station, TX (US); Riichi Nishimura, Hyogo (JP)

(73) Assignees: THE TEXAS A&M UNIVERSITY SYSTEM, College Station, TX (US); KANEKA CORPORATION, Osaka (JP)

( * ) Notice: Subject to any disclaimer, the term of this patent is extended or adjusted under 35 U.S.C. 154(b) by 0 days.

(21) Appl. No.: 14/043,396

(22) Filed: Oct. 1, 2013

(65) Prior Publication Data
US 2014/0193590 A1 Jul. 10, 2014

Related U.S. Application Data

(60) Provisional application No. 61/749,106, filed on Jan. 4, 2013.

(51) Int. Cl.
*B05D 1/02* (2006.01)
*B05D 1/12* (2006.01)
*C09C 1/00* (2006.01)
(Continued)

(52) U.S. Cl.
CPC .............. *C09C 1/0015* (2013.01); *B82Y 30/00* (2013.01); *C08J 5/005* (2013.01); *C08J 7/047* (2013.01); *C08J 7/06* (2013.01); *C09D 5/29* (2013.01); *C09D 5/36* (2013.01); *C09D 7/1258* (2013.01); *C09D 7/1291* (2013.01);
(Continued)

(58) Field of Classification Search
CPC .......... C08J 5/005; C08J 7/06; C09D 133/00; C09D 163/00; C09D 5/29; C09D 5/36; C09D 7/1258; C09D 7/1291
USPC ....................................................... 427/427
See application file for complete search history.

(56) References Cited

U.S. PATENT DOCUMENTS 7,108,935 B2  9/2006  Bauer et al.
2009/0035469 A1  2/2009  Sue et al.
(Continued)

FOREIGN PATENT DOCUMENTS

JP    2010095392 A    4/2010
KR    100764560 B1    10/2007
(Continued)

OTHER PUBLICATIONS

Sue et al. "Epoxy Nanocomposites Based on the Synthetic Alpha-Zirconium Phosphate Layer Structure". Chem Mater. 2004, 16, 242-249.*

(Continued)

*Primary Examiner* — Alexander Weddle
(74) *Attorney, Agent, or Firm* — Oblon, McClelland, Maier & Neustadt, L.L.P.

(57) ABSTRACT

A method of manufacturing a nanocomposite having a continuous organic phase and oligomer-modified nanoplatelet mesomorphic structures, wherein the oligomer has a molecular weight of at least 100 g/mol.

17 Claims, 19 Drawing Sheets

(51) Int. Cl.
| | |
|---|---|
| *C08J 5/00* | (2006.01) |
| *C08J 7/04* | (2006.01) |
| *C08J 7/06* | (2006.01) |
| *C09D 5/29* | (2006.01) |
| *C09D 5/36* | (2006.01) |
| *C09D 7/12* | (2006.01) |
| *C09D 133/00* | (2006.01) |
| *C09D 163/00* | (2006.01) |
| *C09D 175/00* | (2006.01) |
| *B82Y 30/00* | (2011.01) |

(52) U.S. Cl.
CPC ........... *C09D 133/00* (2013.01); *C09D 163/00* (2013.01); *C09D 175/00* (2013.01); *C08J 2363/00* (2013.01)

(56) References Cited

U.S. PATENT DOCUMENTS

| | | | |
|---|---|---|---|
| 2010/0009165 A1* | 1/2010 | Patel et al. ................ | 428/323 |
| 2010/0092765 A1 | 4/2010 | Hager et al. | |
| 2012/0065311 A1 | 3/2012 | Chakraborty et al. | |

FOREIGN PATENT DOCUMENTS

| | | |
|---|---|---|
| WO | WO 2005/100466 A1 | 10/2005 |
| WO | WO 2009/014685 A1 | 1/2009 |

OTHER PUBLICATIONS

PCT/US2014/010288 International Search Report and Written Opinion dated Jul. 16, 2014 (10 p.).

Extended European Search Report issued Jun. 19, 2015 in Patent Application No. 13189779.5.

Office Action issued Jul. 27, 2015 in European Patent Application No. 13189779.5.

Naima Bestaoui, et al., "Intercalation of polyether amines into α-zirconium phosphate" Journal of Materials Chemistry, vol. 16, XP055194566, 2006, pp. 759-764.

Zenon Klapyta, et al., "Intercalation of protonated polyoxyalkylene monoamines into a synthetic Li—fluorotaeniolite" Applied Clay Science, vol. 52, No. 1, XP028372089, 2011, pp. 133-139.

Weiyi Xing, et al., "Flame retardancy and thermal properties of epoxy acrylate resin/alpha-zirconium phosphate nanocomposites used for UV-curing flame retardant films" Materials Chemistry and Physics, vol. 125, No. 1-2, XP027443587, 2011, pp. 196-201.

* cited by examiner (a)

(b)

SURFACE-MODIFIED, EXFOLIATED NANOPLATELETS AS MESOMORPHIC STRUCTURES IN SOLUTIONS AND POLYMERIC MATRICES

CROSS-REFERENCE TO RELATED APPLICATIONS

This application claims the benefit under 35 U.S.C. §119(e) of U.S. Provisional Patent Application No. 61/749,106 filed on Jan. 4, 2013, titled "Surface-Modified, Exfoliated Nanoplatelets as Mesomorphic structures in Solutions and Polymeric Matrices" the entire disclosure of which is hereby incorporated herein by reference.

STATEMENT REGARDING FEDERALLY SPONSORED RESEARCH OR DEVELOPMENT

Not applicable.

BACKGROUND

This disclosure relates to nanocomposite comprising modified nanoplatelet materials, and more specifically to a method to prepare nanomaterial that self-assembles into mesomorphic structures in organic continuous phase.

Generally, nanoparticle and nanomaterials research has been focused on the development of nanotubes, especially carbon nanotubes, for incorporation in commercial applications. However, other species of nanoparticles including nanoplatelets that have begun to attract additional interest for research, development and the production of commercial materials. Nanoplatelets are planar, having at least one dimension that is smaller than 100 nanometers (nm). Exemplary nanoplatelets include inorganic crystalline materials and derivatives thereof. More particularly, $\alpha$-Zirconium phosphate ($\alpha$-ZrP) has a layered crystalline structure and functions as an ion exchanger. $\alpha$-ZrP has been studied as a potential material for catalysts, drug delivery agents, proton conductors, and nanofillers, among other uses. Thus, $\alpha$-ZrP serves as a model for other materials such as silicates, phosphates, metal oxides, and hydroxides because, these materials also exist as layered crystalline structures and chemical modifications using amines may be applicable with these alternative materials.

Iridescence has been observed in solutions of surfactant molecules and inorganic nanoplatelets in the presence of highly ordered mesophases. Bragg reflection in the visible wavelengths occurs as surfactant bilayers or inorganic nanoplatelets form periodic smectic or lamellar structures having interlamellar spacings on the order of 200 nm and is perceived as iridescence. The occurrence of iridescence is an indication that light is interacting with a material due to its photonic structure. The ability to assemble photonic structures out of nanoplatelets gives rise to the potential of coupling their intrinsic properties with the interaction of light. Other inorganic nanoplatelets form mesomorphic smectic phases in aqueous dispersions have been noted. This was first observed in $H_3Sb_3P_2O_{14}$ nanosheets and iridescence appears as water swelled the solid gel of this material with increased interlamellar spacing. The iridescence color-shifted from blue to red as more water molecules inserted between the nanoplatelets, thereby reducing the concentration of the nanoplatelets. However, aqueous dispersions prevent hydrophobic or other water-sensitive chemical modifications.

Generally, organic solvents have applications in industrial processes that are widespread and economical. Thus, the ability to assemble photonic structures of nanoplatelets in organic solvents has low-cost, commercially attractive properties. Colors created by photonic structures do not fade under exposure to sunlight, unlike dye-based colors. Commercially viable, non-aqueous alternative protocols and nanomaterials have not been developed to date.

BRIEF SUMMARY

This disclosure relates to nanocomposite comprising a continuous organic phase and modified nanomaterials that self-assemble into mesomorphic structures therein. More specifically, the resulting dispersion of modified nanoplatelets in the organic phase exhibit iridescence throughout the visible spectrum, which is tunable by varying the concentration of modified nanoplatelets. The resulting nanocomposite of such modified nanoplatelets exhibits certain gas barrier properties with consistent performance at high and low humidity conditions. This disclosure also relates to a method of spray-coating to manufacture nanocomposite films contain said nanoplatelets. Further, there is a method to produce oligomer-modified nanoplatelets using polyether monoamine to achieve mesomorphic structures in said organic phase. Generally, the method comprises the modification of the nanoplatelets by polyether monoamine to achieve dispersibility in organic solvent(s), the self-assembly of mesomorphic structures, and the incorporation of the mesomorphic structures in said organic phase. Also, the mesomorphic structures are nematic and smectic arrangements of nanoplatelets.

Further, the methods herein may provide oligomer-modified nanoplatelets that self-assemble into mesomorphic structures in said organic that exhibit Bragg reflections in the visible wavelengths, which is defined as the wavelengths of light from 390 nm to 750 nm. The disclosure herein illustrates a nanocomposite comprising of nanoplatelets assembled into mesomorphic structures that exhibit certain gas barrier properties, and consistent performance at high and low humidity levels. Likewise, a method of manufacturing a nanocomposite film comprising of nanoplatelets assembled into mesomorphic structures through the use of the spray-coating process is discussed herein.

Nanocomposites and a method of manufacturing the nanocomposites having nanoplatelets modified with oligomeric and polymeric species. The nanoplatelets are capable of forming mesomorphic structures in solutions and polymeric matrices. The mesomorphic structures are highly ordered nematic or smectic arrangements of nanoplatelets. The mesomorphic structures can exhibit tunable properties such as Bragg reflection of light including wavelengths in the visible range depending on the d-spacing. The mesomorphic structures can also be included in a polymeric matrix to form a nanocomposite with greatly improved barrier properties and mechanical properties. This disclosure also relates to the method of applying this nanocomposite onto a substrate via spray-coating to form a barrier film and other applications.

Thus, embodiments described herein comprise a combination of features and advantages intended to address various shortcomings associated with certain prior devices. The various characteristics described above, as well as other features, will be readily apparent to those skilled in the art upon reading the following detailed description of the preferred embodiments, and by referring to the accompanying drawings.

NOTATION AND NOMENCLATURE

Certain terms are used throughout the following descriptions and claims to refer to particular molecules, materials, or components. This document does not intend to distinguish between those that differ in name but not function. In the following discussion and in the claims, the terms "including" and "comprising" are used in an open-ended fashion, and thus should be interpreted to mean "including, but not limited to . . . ".

The "nanoplatelets" of this disclosure may consist of silicates and derivatives thereof, metal phosphates, metal oxides or metal hydroxides. In certain instances, zirconium phosphate or an alloy of zirconium phosphate with other elements or mixture of zirconium phosphate with nanoplatelets of other species.

"Bragg reflection" refers to the physical phenomenon where light is diffracted by a material possessing regular structures when the Bragg condition is satisfied. This phenomenon is closely associated with iridescence.

"d-spacing" refers to the distance between layers of nanoplatelets in organic solvents or polymer resin.

"Iridescence" refers to the property of certain materials that appear to change color when either the viewing or illumination angle is changed. This phenomenon arises when Bragg reflection occurs.

"Mesomorphic structures" refer to a highly ordered arrangement of nanoplatelets with directional or positional order.

"Modification" refers to the process by which a molecule is attached to the nanoplatelet surface to alter its surface properties.

"Nanocomposite" refers to a composite material of polymer and particles, where the particle is of various forms and shapes and with at least one dimension smaller than 100 nanometers.

"Nanoplatelet" refers to a nanoparticle in the form of a sheet or platelet, where the thickness is significantly smaller than the other two dimensions.

"Oligomer" refers to a molecule comprising of a few or limited number of monomer units.

"Permeability" refers to a quantity that measures the ability of a gas molecule to diffuse through a material.

"Photonic structure or crystal" refers to a material with periodic mesoscopic structure and as a result interacts with light.

BRIEF DESCRIPTION OF THE DRAWINGS

For a detailed description of exemplary embodiments of the disclosure, reference will now be made to the accompanying drawings in which.

DETAILED DESCRIPTION

Figure 1:
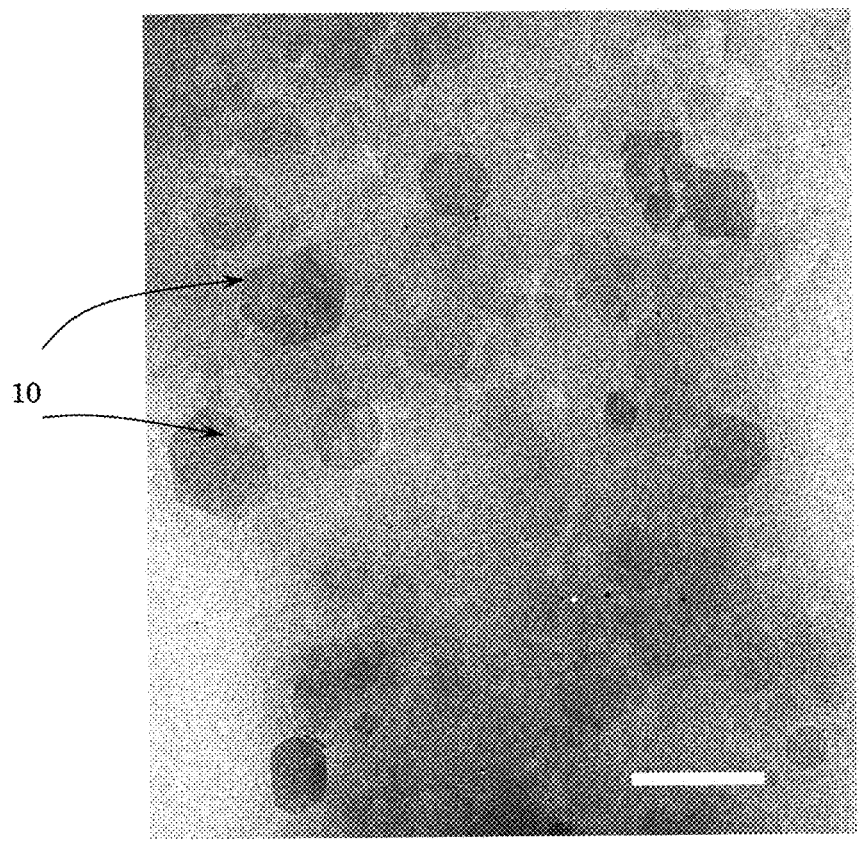
FIG. 1 illustrates a transmission electron micrograph of α-ZrP nanoplatelets having an average size of 100 nm (scale bar is 100 nm).

Overview:

Generally, biological materials such as nacre or mother-of-pearl have outstanding strength and stiffness due to the robust architecture comprising of alternating layers of soft protein and highly aligned calcium carbonate platelets. The mechanical performance of polymer composites may be improved by exploring unique lamellar structures inspired by the architecture of these biological materials. The present disclosure relates to a solvent-based method for forming smectic or nematic arrangements of nanomaterials in polymeric systems to form lamellar nanocomposites. More specifically, the present disclosure relates to nanocomposites comprising clay nanoplatelets organized into mesomorphic structures with conserved interlamellar spacings.

Gibbsite nanoplatelets suspended in dimethyl sulfoxide (DMSO), a polar aprotic solvent, form a smectic B-phase where the nanoplatelets are organized in a hexagonal order within each lamella. Strong electrostatic repulsion due to the charges on each nanoplatelet in a low-ionic strength solution enables the layers to maintain a comparatively large distance, for example up to about 125 nm. In these cases, iridescence has not been observed, because the interlamellar distance was not sufficient to observe Bragg reflection in the visible wavelengths. As noted herein, iridescence is typically observable with interlamellar spacings greater than about 200 nm. Thus, industrial examples of iridescence in smectic phase nanoplatelets are not currently reported.

Also, the layer-by-layer (LbL) assembly of clay-containing composites has shown promising effectiveness for creating a barrier to gas diffusion and flame retardant coatings. It is hypothesized that these properties are a result of the aligned clays sequentially deposited onto the substrate through the LbL process. However, industrial applications of the LbL process require each layer of clay and polymer to be deposited individually and cured. Many cycles are required to build up the films that have the desired or required properties. Also, specialized equipment, the low throughput rate of the LbL process, and the use of hydrophilic polyelectrolytes represent significant hurdles to manufacturing such films. Furthermore, variation in permeability may result in greater than about 0.2 cc mm/m$^2$ day atm at high and low humidity levels. While spray-coating of clay-polymer coatings have been used for corrosion protection coatings, these coatings do not exhibit the long-range orientation and alignment typical of smectic phase liquid crystals.

Polymer and clay compositions illustrate other industrial advantages due to the low cost of clay, simple preparation, stiffening behavior, and potential industrial applications. Due to the reasons described above, a method of preparing highly aligned clay nanoplatelets in a coating that is econonomically viable is highly desirable. It is theorized herein that the clay nanoplatelets may create a tortuous path forcing gas molecules to diffuse over a longer distance in film applications compared to a film without clay, thereby improving barrier-film properties. More specifically, exfoliated nanoplatelets may be applied in polymeric coatings to maximizing the distance which gas molecules are forced to traverse, thereby greatly improving the barrier properties. Such a coating may have applications including gas barriers, electronics packaging, flame resistant shields, and anti-corrosion, thermal and electrical insulation coating, etc. Additionally, the improved mechanical properties disclosed herein, for example tensile strength and Young's modulus, may have applications in different fields of engineering applications, e.g., light-weight transportation bodies, advanced structures, high-performance electronic devices, and biomedical implants Mesomorphic Nanocomposites:

As described herein, there is an industrial method that allows iridescent-photonic coatings, films, and liquids to be processed in organic solvents and used with polymer resins. In certain instances, to create iridescent non-fading coatings. Further, modified-nanoplatelets are assembled into mesomorphic structures in organic solvents may be capable of being subjected to external stimuli including, but not limited to, electrical, magnetic and thermal fields. The exemplary external stimuli may be used to effect changes in the mesomorphic structure in an application specific manner. Further, in an organic solvent, the nanoplatelets may be functionalized with molecules that react preferentially to specific agents, such as gas molecules, toxins, biomolecules and chemical agents. The functionalized nanoplatelets may have a resulting change in d-spacing, thereby changing the color of iridescence. An exemplary application for a functionalized nanoplatelet with molecule-responsive iridescence includes visual sensors to detect chemical explosives, gases and other molecular agents.

The present disclosure relates to layered nanomaterials which are modified as nanoplatelets and incorporated into nanocomposites. The nanoplatelets self-assemble into mesomorphic structures in an organic continuous phase comprising solvents and polymers. The assembled mesomorphic structures are defined here as nematic or smectic phases of the nanoplatelets. In general, the organic continuous phase or matrix comprises an organic polymeric material, such as but not limited to reactive polymers and prepolymers.

Nanoplatelets:

The nanoplatelets described herein are chosen from any layered candidate material. Examples, of candidate materials include, but are not limited to, natural and synthetic silicates such as montmorillonite, bentonite, laponite, and phosphates, metal oxides and metal hydroxides, graphene, graphene oxides, and derivatives thereof. Nanoplatelets have a generally planar shape, wherein at least one dimension is more than about 10 times the measurement of at least one other dimension. Alternatively, two dimensions are greater than about 10 times the measurement of the remaining dimension. In some instances, the diameter or average diameter of the nanoplatelet is more than about 10 times the thickness of the nanoplatelet. While a range of nanoplatelet diameters may be synthesized, the exemplary nanoplatelets have an average diameter of about 10 nm to about 3000 nm (3 microns); alternatively from about 50 nm to about 750 nm. Also, the nanoplatelets may have an aspect ratio or diameter:thickness ratio of at least about 100:1; alternatively about 500:1; and in certain instances the nanoplatelets have an aspect ratio of at least about 1000:1.

In non-limiting, exemplary embodiments, the candidate material is a clay nanoplatelet, such as α-zirconium phosphate (α-ZrP) or α-zirconium hydrogen phosphate. In exemplary embodiments, α-ZrP nanoplatelets have an average diameter of about 100 nm as shown as 10 in FIG. 1. Alternatively, the α-ZrP nanoplatelets having an average diameter of about 625 nm are shown as 20 in FIG. 2.

Modified Nanoplatelets:

Generally, modifications disclosed herein may be applicable to any nanoplatelet derived from any candidate material disclosed hereinabove. The nanoplatelets are structurally modifiable in that they lack structural or steric hinderances. Additionally, the nanoplatelets are chemically modifiable by the addition of oligomers or oligomeric functional groups. The modification of the nanoplatelets forms exfoliated nanoplatelets or single crystalline layers of the candidate material. The exfoliation of the nanoplatelets comprises a solvent.

Generally, the oligomers intercalate between layers of the nanoplatelets in order to exfoliate and modify the nanoplatelets. The oligomers of the present disclosure comprise any functional groups such as amines, amides, esters, hydroxyls, formyls, carbonyls, carboxyls, or acetyls, without limitation. In instances, the oligomers comprise amines and in certain examples, the oligomers comprise polyether monoamines. The structure of polyether monoamine is $CH_3(OCH_2CHR_1)_l$—$(OCH_2CHR_2)_m$—$(OCH_2CHR_3)_n NH_2$, whereby $R_1$, $R_2$ and $R_3$ can be H or $CH_3$, and the values of l, m and n are greater than about 0. In instances, the values of l, m and n may have no restrictions on the upper limit. Alternatively, the polyether monoamine comprises poly(oxyalkylene) monoamine wherein, the oligomers comprise polyethylene glycol segments ($OCH_2CH_2$) or polypropylene glycol segments ($OCH_2CHCH_3$). In instances, the molecular weight (Mw, g/mol) of the polyether monoamine is greater than about 100 g/mol, alternatively, the molecular weight is greater than about 850 g/mol, and in certain instances the molecular weight is greater than about 900 g/mol.

Without limitation by any particular theory, the single primary amine terminal group on the oligomers provides a cationic charge to the exfoliated nanoplatelet surface for long range electrostatic repulsion. Modification of the nanoplatelets proceeds via a proton exchange of the phosphate group on the α-ZrP nanoplatelet to a single primary amine group.

Generally, the organic media or organic phase comprises a solvent. More specifically, the continuous organic phase comprises a polar solvent to stabilize the modified nanoplatelets. In instances, the solvent is a polar aprotic solvent such as but not limited to acetone, ethyl acetate, dichloromethane (DCM), dimethylformamide (DMF), dimethyl sulfoxide (DMSO), tetrahydrofuran (THF), propylene carbonate, 2-butanone (MEK), 4-methyl-2-pentanone (MIBK), cyclohexanone, and nitriles such as acetonitrile (MeCN), propionitrile, butyronitrile, acrylonitrile, etc., without limitation. In non-limiting exemplary embodiments, the solvent is acetone.

Mesomorphic Structures:

As described herein, the modified nanoplatelets in polar aprotic solvents self-assemble into mesomorphic layers. The mesomorphic layers are generally comprised of a plurality of the exfoliated and modified nanoplatelets that have at least partially co-crystallized in a single plane. A mesomorphic layer has at least one dimension that is greater than about a half micron (500 nm) and alternatively, greater than about one micron (1000 nm). Generally, the mesomorphic layers form smectic phases, such that each layer is capable of moving or sliding relative to another layer.

Further, each of the mesomorphic layers of the modified having an approximately conserved distance therebetween. The distance or d-spacing(s) between the layers is inversely proportional to the concentration of the nanoplatelets in the solution. That is to say that the d-spacing is related to the concentration of the modified nanoplatelets in solution such that a higher concentration leads to a smaller d-spacing, and vice versa. The d-spacing of the mesomorphic layers is at least about 130 nm, for example at high concentration. Alternatively, at least about 180 nm or in certain instances at least about 240 nm, for example at low concentration.

Figure 3:
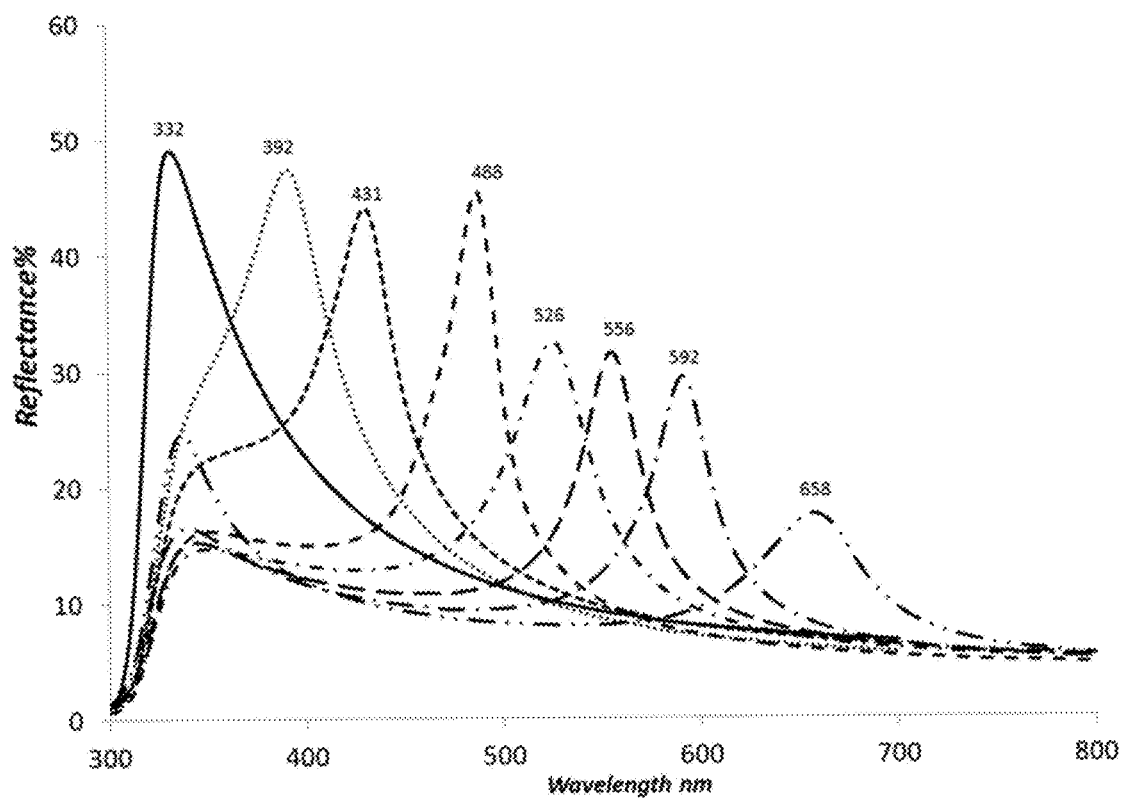
FIG. 3 graphically illustrates the reflectance spectra of α-ZrP nanoplatelets in butyronitrile at multiple concentrations, wherein the peak positions are labeled for each spectrum.

The d-spacing between each mesomorphic layer is measurable by Bragg reflections at various visible wavelengths, between about 390 nm and about 720 nm. Further, the reflectance of the mesomorphic layers provides for the concentration of the exfoliated nanoplatelets. Without limitation by any particular theory, visible light interacts with the mesomorphic layers at distances over about 100 nm. Bragg reflections of light in the visible range create iridescence with distinct colors. The colors of the iridescence are controlled by the d-spacings of nanoplatelets that self-assembled into smectic phases in the solvents. Thus, a smaller d-spacing leads to iridescence in a color of shorter wavelengths, and vice versa. Further, controlling the concentration of the nanoplatelets in the solvent permits the control of the color of iridescence. In the non-limiting exemplary embodiment shown in FIG. 3, the Bragg reflectance spectra of butyronitrile solutions of α-ZrP nanoplatelets illustrates the iridescence peaks shifting from red to violet and ultimately ultraviolet as concentration is increased and the d-spacings are decreased.

Products:

As described herein, the modified nanoplatelets suspended in solvents may be incorporated into products such as, but not limited to polymers, epoxies, resins, coatings, and combinations thereof. In instances, the products may also be considered a continuous organic phase or organic phase media. In certain instances, the products incorporate modifiers, such as curing agents, vulcanizing agents, or cross-linking agents. Maintaining the concentration and d-spacings of the mesomorphic layers in the products maintains the iridescence.

The self-assembly of modified nanoplatelets in organic media or organic solvents allows hydrophobic and organophilic molecules to be introduced into the solvent-modified nanoplatelet solution. Organic media or solvents such as but not limited to epoxy resins, ketones, and aliphatic nitriles may be incorporated into the solution. Also, acetone, methanol, ethanol, propanol, toluene, methyl ether ketones, urethane, and derivatives, acrylic and derivatives, and other liquid media at room temperature, without limitation, may be incorporated into the solvent-modified nanoplatelet solution. In instances, epoxy, epoxy resins, and epoxy derivatives are examples of such a hydrophobic or organophilic molecule. Further, the curing agents included in this disclosure include thermal, moisture and radiation curable agents. Thermal curable agents are activated by heat and include, but not limited to, amines, anhydrides, polyamides and catalytic curing agents. Moisture curable agents are activated by the absorption of moisture and include, but are not limited to, ketimines. Radiation curable agents are activated by exposure to radiation such as ultra-violet (UV) light. These include, but are not limited to, cationic UV catalysts such as triphenylsulfonium hexafluoroantimonate. In certain instances, the curing agents may comprise a monomer or oligomer that may be initiated for polymerization of the aforementioned monomers or oligomers. Further, the disclosed epoxies and epoxy resins may include the reactive oxirane structure which can react with amines, anhydrides, polyamides, polyamideamines, groups and other reactive groups to form a cross-linked polymeric solid. The concentration of the modified nanoplatelets in the continuous phase comprises a concentration of less than about 50 wt %; alternatively, less than about 25 wt % and in certain instances, less than about 20 wt %.

Once dried or cured, the products comprising the exfoliated-nanoplatelets in mesomorphic structures may have a d-spacing between about 2 nm and about 20 nm alternatively between about 2 nm and 50 nm; in certain products the d-spacing is between about 2 nm and about 20 nm; and in alternatively products have a d-spacing that is between about 2 nm and about 10 nm. Without limitation by any particular theory, the d-spacings within these ranges provide excellent gas barrier properties.

Figure 2:
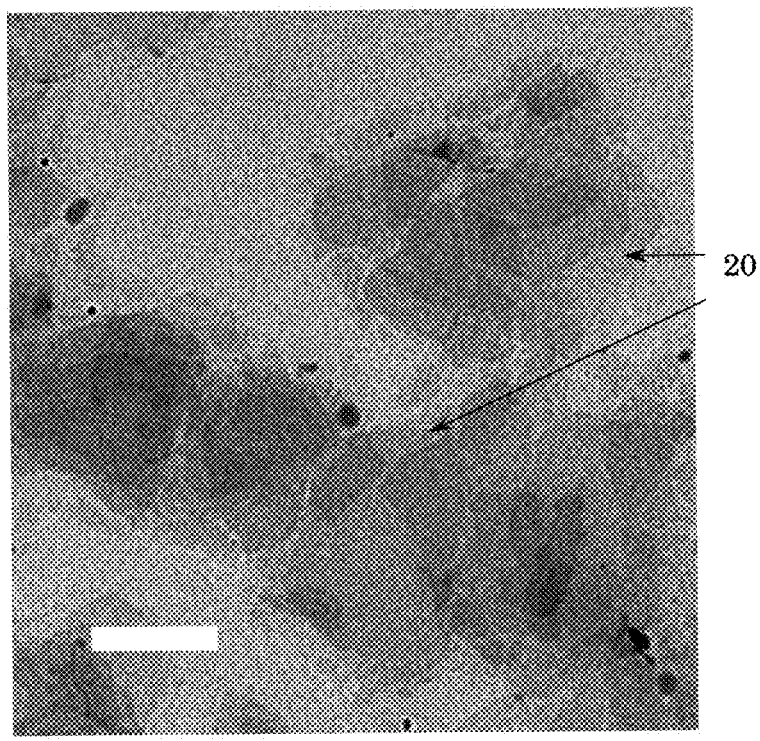
FIG. 2 illustrates a transmission electron micrograph of α-ZrP nanoplatelets having an average size 625 nm (scale bar is 500 nm).
Figure 4:
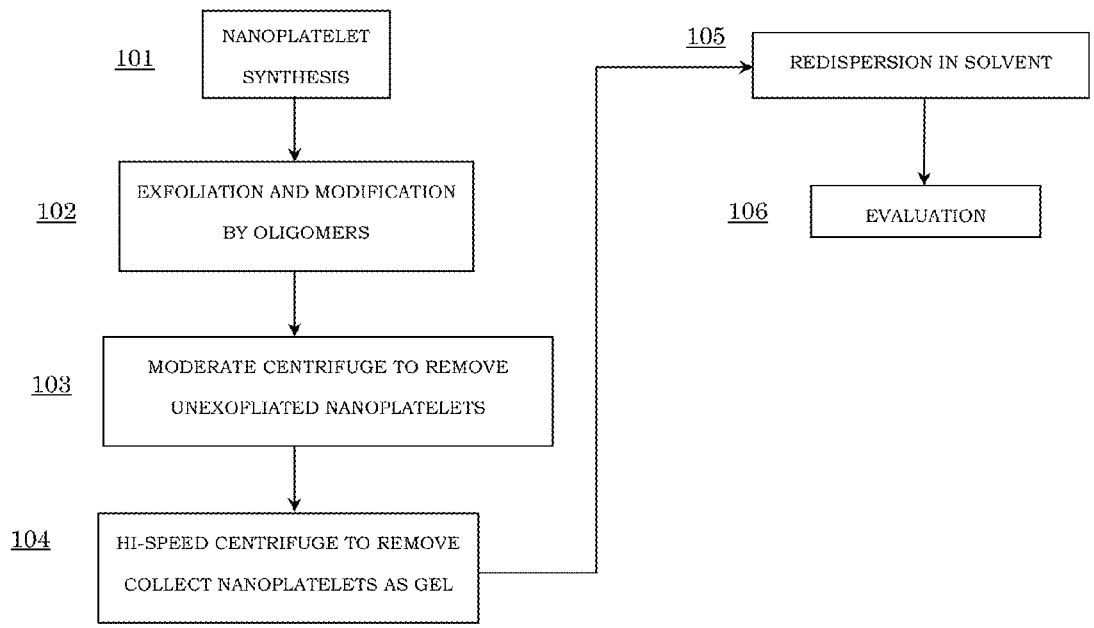
FIG. 4 schematically illustrates a production process for oligomer-modified nanoplatelets according to the current disclosure.

Method:

Referring now to FIG. 4 there is illustrated a method for the production of mesomorphic structures of oligomer-modified nanoplatelets as described herein. Nanoplatelets 10 and 20 as shown in FIGS. 1 and 2 are synthesized in an aqueous solution during step 101. Once purified they are exfoliated and modified by oligomers during step 102. After which centrifugation at a moderate speed and time 103 is carried out to remove unexfoliated components. In certain instances, moderate speed and time may be considered about 10,000 RPM for about 30 minutes. The clear liquid is centrifuged at high speed for a long duration of time to collect the exfoliated nanoplatelets as a gel in 104. In certain instances high speed and long duration may be considered about 20,000 RPM for about 2 hours. The gel is redispersed in a solvent at appropriate concentrations (step 105) which are then used either for reflectance spectroscopy (step 106) or in the production of nanocomposites.

Figure 5:
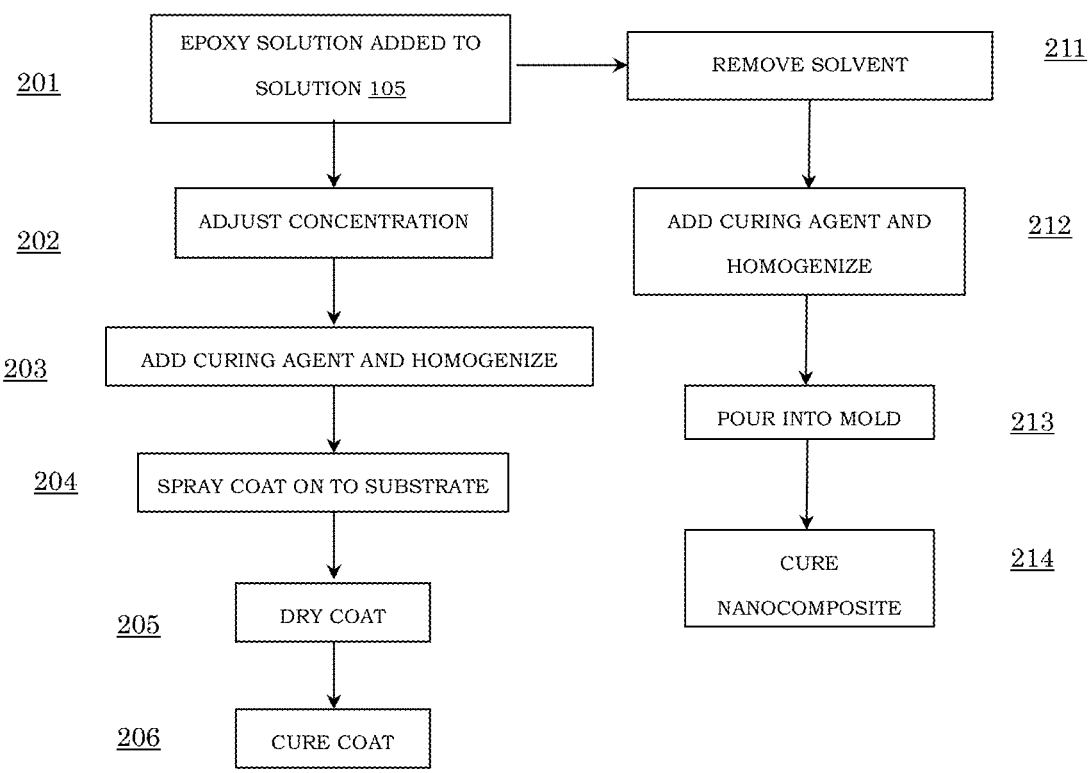
FIG. 5 schematically illustrates a production process for nanoplatelet nanocomposite according to the current disclosure.

Referring now to FIG. 5 there is illustrated a method for the production steps of incorporating oligomer-modified nanoplatelets produced by the above procedure into, for example an epoxy resin. The epoxy resin used in this method may be substituted for any of the products described hereinabove. Generally, two routes of production is described, one for the production of nanocomposite film and the other for bulk nanocomposite. For the production of a nanocomposite film, epoxy is added to solution 105 during step 201. The concentration of combined epoxy/nanoplatelet solution is adjusted by reducing or increasing solvent volume in step 202, followed by addition of curing agent and homogenization by mechanical mixing in step 203. The solution is loaded into a spray gun and spray-coated on to a substrate in step 204. Spraying can continue as long and as many times to obtain the desirable coat thickness, concentration, and uniformity. An exemplary coating thickness may be between 1 micron and about 100 microns, without limitation. The coated article is then dried at a mild temperature, such as but not limited to 40° C., to allow all solvent to be removed in step 205. The dried coat is then cured at an appropriate temperature and time in step 206. In non-limiting examples, the curing temperature may be: 120° C. for about 2 hours; alternatively, 177° C. for about 4 hours, and still further at about 200° C. for about 4 hours. For the production of a bulk nanocomposite, solvent is removed in step 211 after step 201 is done. Curing agent is added to the nanoplatelet/epoxy mixture and homogenized with mechanical stirring at an elevated temperature in step 212. The homogenized mixture is poured into a mold and cured.

Figure 6:
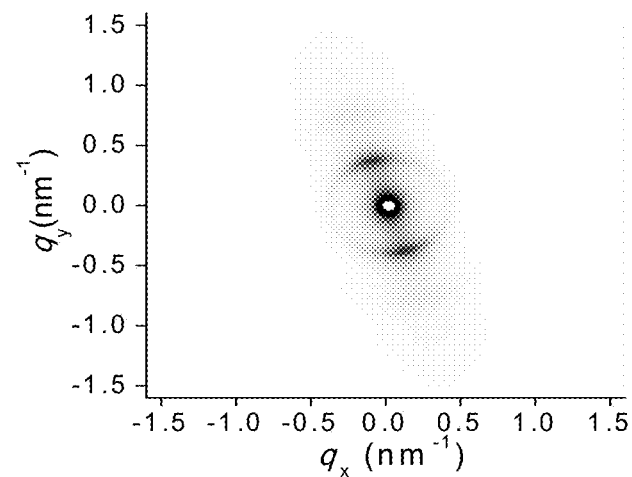
FIG. 6 graphically illustrates the small-angle x-ray diffractograms of nanocomposite such that (a) is a 2-dimensional (2D) diffractogram and (b) is 1-dimensional (1D) diffractogram, according to an exemplary embodiment described in Example 2.
Figure 6:
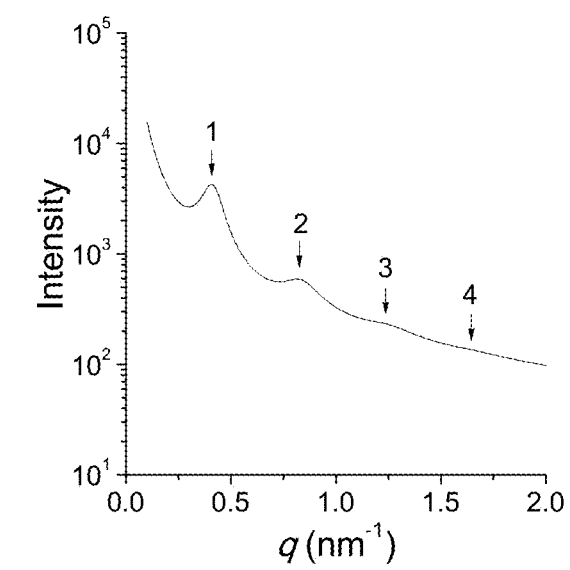

Properties:

The oligomer-modified exemplary α-ZrP nanoplatelets prepared by the method described above incorporated into a product or polymer resin such as epoxy assembles into smectic phases with regular d-spacings. The small-angle x-ray 2D diffractogram, shown for example in FIG. 6a of such a bulk nanocomposite illustrates the orientation of the smectic arrangement of nanoplatelets. The 1D diffractogram shown in FIG. 6b illustrates the d-spacing of the smectic phase to be about 15.2 nm.

Figure 7:
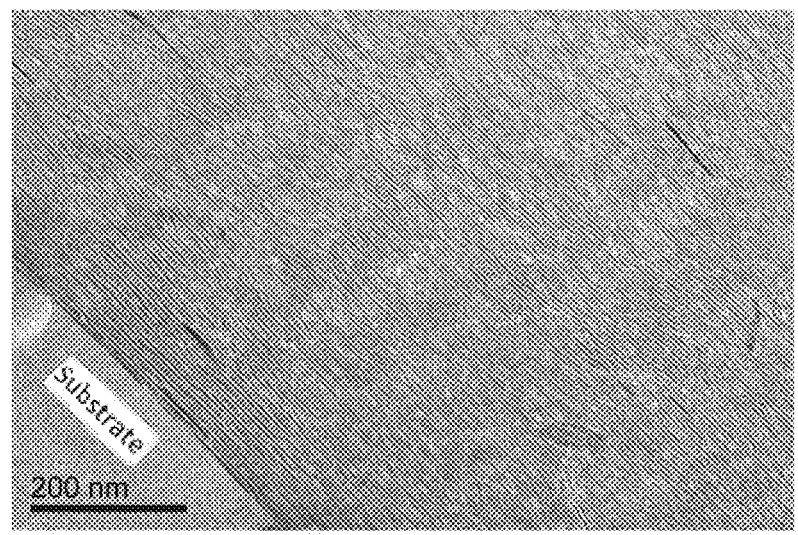
FIG. 7 illustrates a transmission electron micrograph of spray-coated nanocomposite film on a polyimide substrate.
Figure 8:
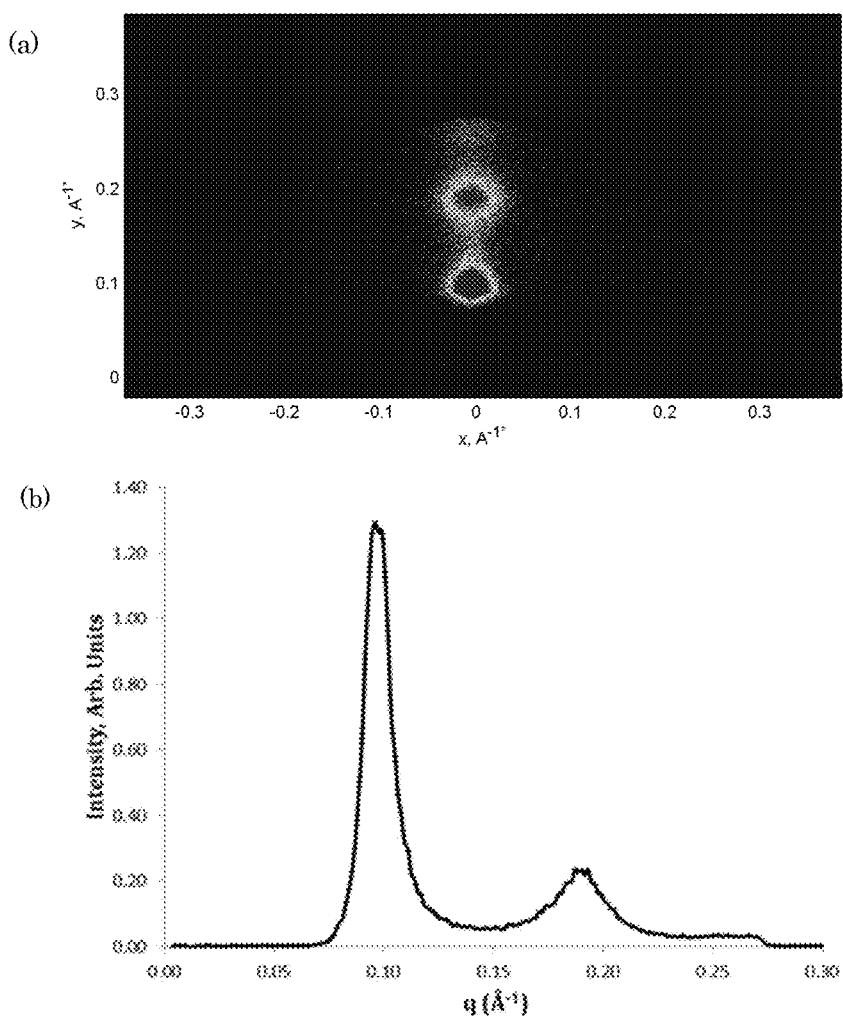
FIG. 8 graphically illustrates a grazing-incidence small-angle x-ray diffractograms such that (a) is 2D diffractogram and (b) is 1D diffractogram, according to an exemplary embodiment described in Example 3.

Oligomer-modified nanoplatelets in spray-coated nanocomposite films also assembled into smectic phases as described hereinabove. The transmission electron microscope (TEM) image in FIG. 7 illustrates that local orientation of nanoplatelets is parallel to the substrate with a mean interlayer distance of about 6.5 nm measured from the micrograph. The grazing-incidence small-angle x-ray 2D diffractogram shown FIG. 8a of such a nanocomposite film spray-coated on to a polyimide substrate illustrates the global orientation that is characteristic of nanoplatelets that is aligned parallel to the substrate. Interference peaks are observed only in the vertical axis, which is interpreted as nanoplatelets being oriented parallel to the substrate exclusively. The 1D diffractogram of FIG. 8b illustrates the d-spacing of the smectic phase to be about 6.5 nm.

Figure 9:
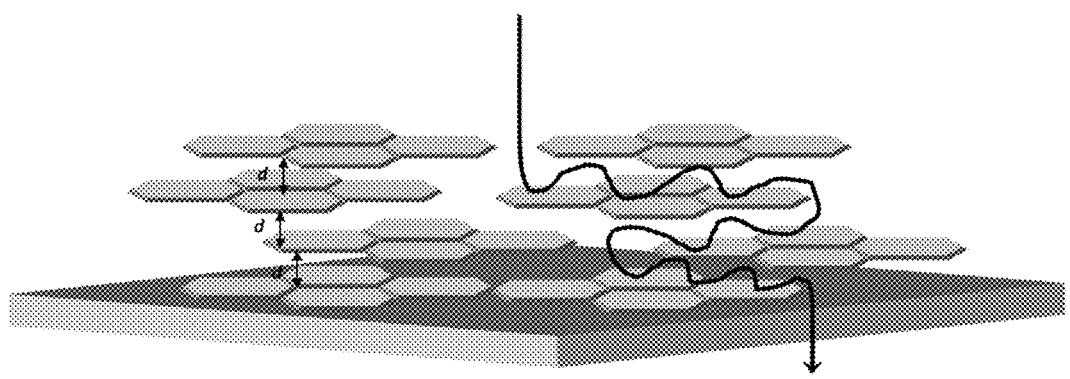
FIG. 9 conceptually illustrates a smectic arrangement of nanoplatelets aligned parallel to a substrate, having an interlayer distance d between each layer and wherein the arrowed line traces a potential diffusion path of a gas molecule therethrough.

The nanocomposite films provide certain gas barrier properties. In a nanocomposite containing highly oriented nanoplatelets, a gas molecule must diffuse through a tortuous path to reach the other side of the film. This greatly reduces the permeability of the film. This concept is schematically illustrated in FIG. 9, where the nanoplatelets self-assembles into layers with regular interlayer distance d, and a representative path of a gas molecule is traced by a black arrowed line. This disclosure provides a method that allows nanoplatelets to self-assemble into such a mesomorphic structure using an efficient process of application via spray-coating. In instances, the spray coated and cured nanocomposite comprises 0.1 or less of relative gas/vapor permeability (P/P$_0$) at 90% RH (relative humidity), and 50% RH, respectively.

Figure 10:
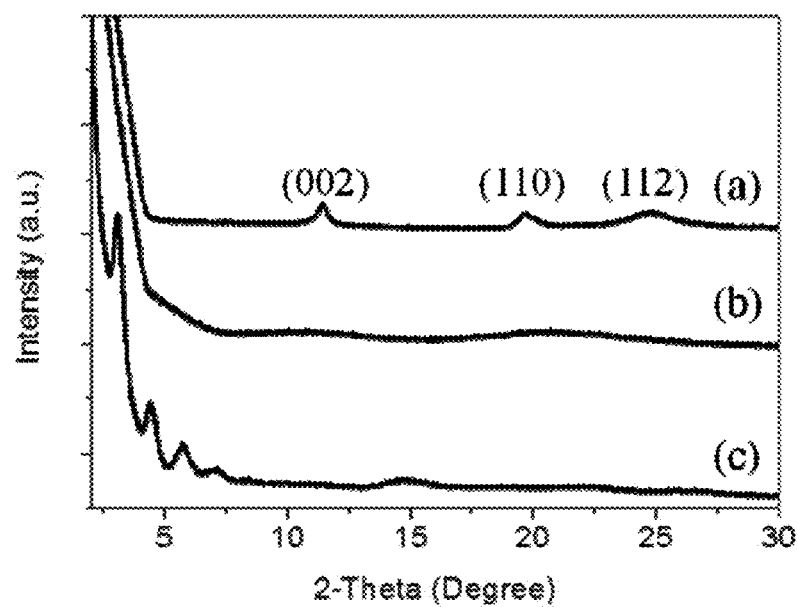
FIG. 10 graphically illustrates the X-ray diffraction (XRD) results of (a) pristine α-ZrP powder, and modified α-ZrP nanoplatelets/epoxy nanocomposites films with ZrP content of (b) 8.4 wt %, and (c) 17 wt %.

When inorganic nanoplatelets are chosen as a filler of polymer nanocomposites, exfoliation of nanoplatelets in polymer matrix may be utilized achieve an efficient reinforcing effect. FIG. 10 presents the XRD patterns of pristine ZrP and the modified α-ZrP nanoplatelets in epoxy nanocomposite films with various ZrP loadings. The XRD pattern of pristine ZrP shows a peak at about 0.76 nm for the interlayer distance of the (002) plane as shown in FIG. 10 (a). The modified α-ZrP nanoplatelets/epoxy composites with about 8.4 wt % α-ZrP content, is shown in the XRD pattern of FIG. 10 (b) and exhibits a broad hump at 2θ=19°, corresponding to the structure of the amorphous epoxy matrix, indicating the exfoliation of the modified α-ZrP nanoplatelets in the epoxy matrix. As the modified α-ZrP nanoplatelets loading are increased to about 17 wt %, the XRD pattern of modified α-ZrP nanoplatelets/epoxy film, shown in FIG. 10 (c), indicates the presence of smectic ZrP phase with an inter-layer distance of about 3.3 nm. Further shown in FIG. 11, TEM images is that the modified α-ZrP nanoplatelets are exfoliated in an epoxy without any aggregation. Thus, the modified α-ZrP nanoplatelets are able to self-assemble into aligned mesoscopic structures at about 17 wt % ZrP loading.

Figure 12:
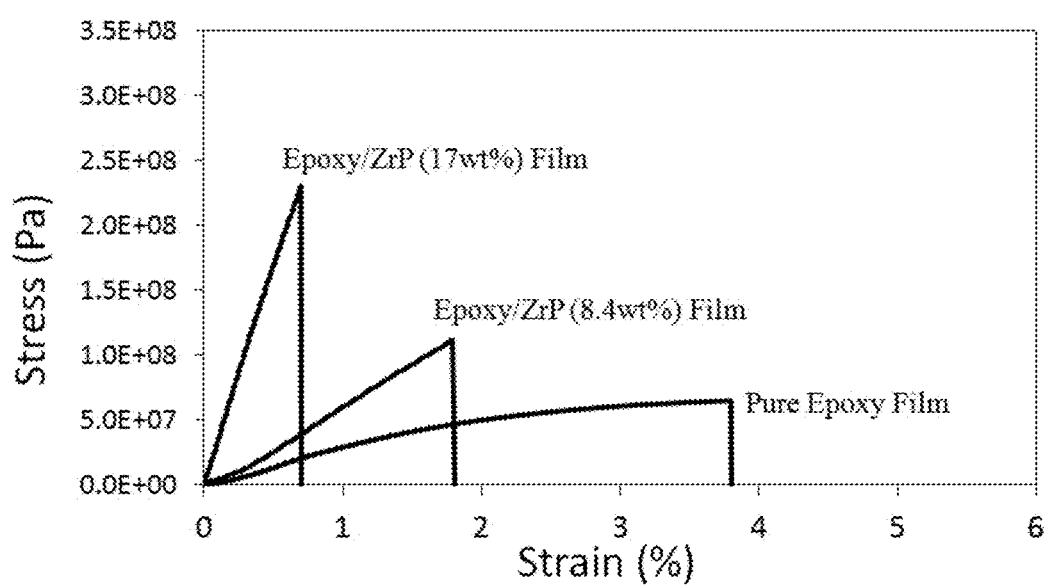
FIG. 12 graphically illustrates the stress-strain curve of a modified α-ZrP nanoplatelets/epoxy nanocomposites films having various ZrP concentrations.

The tensile property of the modified α-ZrP nanoplatelets nanocomposites films ware characterized as shown in the FIG. 12. The modified α-ZrP nanoplatelets nanocomposites film with a thickness about 23 μm and a ZrP concentration of about 17 wt %, shows a modulus of 22 GPa and tensile strength of 210 MPa.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of broader terms such as "comprises", "includes", and "having" should be understood to provide support for narrower terms such as "consisting of", "consisting essentially of", and "comprised substantially of". Accordingly, the scope of protection is not limited by the description set out above but is defined by the claims that follow, that scope including all equivalents of the subject matter of the claims. Each and every claim is incorporated as further disclosure into the specification, and the claims are embodiment(s) of the present invention. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural or other details supplementary to the disclosure.

To further illustrate various illustrative embodiments of the present invention, the following examples are provided.

EXAMPLES

The present examples provide for the assembly of mesomorphic, liquid crystalline phases of nanoplatelets in organic solvents and for incorporation into polymeric systems and resins. The present examples related to the use of oligomers to graft onto the nanoplatelets for the maintenance of electrostatic interactions at long range. Present technologies illustrate similar phenomena observed in aqueous solutions, however, the disclosed methods address the lack of disclosure in organic solutions.

Example 1

Preparation of Oligomer-Modified α-ZrP Nanoplatelets in Organic Solutions

Preparation of Epoxy-Coated Films 15 g of Bisphenol F epoxy (EPON 862, Momentive) was mixed with 3.92 g of curing agent W (Epikure W, Momentive) homogenized in a rotor-evaporator under reduced pressure and heat. The mixture was heated to 120° C. for 30 min until a viscous consistency is reached. The viscous mixture is applied onto heated (60° C.) polyimide films (Apical, Kaneka) with a film coater (Elcometer 4340). The film was cured at 120° C. 2 h, 177° C. 2 h.

Preparation of Nanoplatelets

This procedure produces nanoplatelets of size 500-1500 nm. A sample of 4.0 g $ZrOCl_2 \cdot 8H_2O$ was mixed with 40.0 mL 12.0 M $H_3PO_4$ and sealed into a polytetrafluoroethylene-lined pressure vessel and heated to 200° C. for 24 h. After the reaction, the product was collected by centrifugation, followed by washing by deionized water and centrifugation three times. The product was collected and dried at 65° C. for 24 h. The dried product was ground into fine powder with a mortar and pestle.

Exfoliation and Modification of Nanoplatelets

Exfoliation was carried out using a polyether monoamine, Jeffamine M1000 (Huntsman Chemicals, MW-1000 gmol$^{-1}$, hereafter referred to as M1000). A sample containing 0.5 g of α-ZrP was weighed and dispersed in 25 mL of acetone by sonication for 10 min. A 0.6 gmL$^{-1}$ solution of M1000 in acetone was prepared. A volume of 17.7 mL of M1000 solution was added dropwise to the stirring α-ZrP dispersion. This dispersion was allowed to stir for 4 h. The dispersion was sonicated for 10 min followed by centrifugation at 10,000 rpm for 15 min. The sediment was removed leaving a clear suspension containing only exfoliated α-ZrP and excess polyoxyalkyleneamine. The clear suspension was centrifuged at 20,000 rpm for 3 h and the exfoliated α-ZrP was collected as a gel while the excess polyoxyalkyleneamine remained in the supernatant. The exfoliated α-ZrP was redispersed at different concentrations in acetone, acetonitrile, propionitrile, butyronitrile, acrylonitrile, or olefinic nitriles. To demonstrate that color of iridescence changes with concentration, oligomer-modified α-ZrP of A1-A8, were made and dispersed into butyronitrile. Concentration was determined by drying the liquids of a predetermined volume under mild heating and measuring the mass of the residue. The amount of α-ZrP contained is determined by analyzing the residue in a thermogravimetric analyzer (TA Instruments Q500). The residue is heated at 10° C./min to 900° C. in air and held isothermally for 50 min. The solid residue that remains is zirconium pyrophosphate ($ZrP_2O_7$), which can be converted to the equivalent α-ZrP mass fraction via stoichiometric calculations, i.e., mass fraction of $ZrP_2O_7 \times 1.136$=mass fraction of α-ZrP. The concentration data are included Table 1 with peak position $\lambda_{max}$, as determined by reflectance spectroscopy (see FIG. 3). The data show that as concentration of α-ZrP is decreased, peak position shifts towards longer wavelengths.

Reflectance Spectroscopy Organic Dispersion of Nanoplatelets

Reflectance spectroscopy was performed using a Shimadzu 3600 UV-vis-NIR spectrophotometer. The α-ZrP dispersions were injected into a cuvette (25.4 mm×15.0 mm×1.3 mm, 2.0 mm optical path length) made from two thin rectangular glass plates (Fisher-Scientific) that were double-sealed by solvent resistant epoxy (PermaPoxy 5 min) and silicone (Loctite RTV 587 Blue). White $BaSO_4$ powder was used as a standard for analyzing the reflectance of the samples.

TABLE 1

Relation between peak wavelength and α-ZrP concentration.

| Sample Code | α-ZrP Conc. (wt %) | $\lambda_{max}$ (nm) |
|---|---|---|
| A1 | 1.46% | 332 |
| A2 | 1.02% | 392 |
| A3 | 0.86% | 431 |
| A4 | 0.83% | 488 |
| A5 | 0.57% | 526 |
| A6 | 0.56% | 556 |
| A7 | 0.52% | 592 |
| A8 | 0.40% | 658 |

Example 2

Preparation of Nanocomposite Gas Barrier Film

Preparation of Nanoplatelets

This procedure produces nanoplatelets of size 100 nm. A sample of 20.0 g $ZrOCl_2 \cdot 8H_2O$ was refluxed with 200.0 mL 3.0 M $H_3PO_4$ in a Pyrex glass flask at 100° C. for 24 h. After the reaction, the products were washed and collected by centrifugation three times. Then, the α-ZrP was dried at 65° C. for 24 h. The dried α-ZrP was ground with a mortar and pestle into fine powder.

Exfoliation and Modification of Nanoplatelets

Exfoliation was carried out using M1000. An exemplary procedure to prepare exfoliated nanoplatelets suspended in acetone is described here. A sample containing 0.5 g of α-ZrP was weighed and dispersed in 25 mL of acetone by sonication for 30 min. A 0.6 gmL$^{-1}$ solution of M1000 in acetone was prepared. A volume of 2.77 mL of M1000 solution (equivalent to 1.662 g of M1000) was added dropwise to the stirring α-ZrP dispersion. This dispersion was allowed to stir for 4 h. The dispersion was sonicated for 60 min followed by centrifugation at 10,000 rpm for 30 min. The sediment was removed leaving a clear suspension containing only exfoliated α-ZrP and excess polyoxyalkyleneamine. The clear suspension was centrifuged at 20,000 rpm for 2 h and the exfoliated α-ZrP was collected as a gel while the excess polyoxyalkyleneamine remained in the supernatant. The exfoliated α-ZrP was redispersed in 25 mL of acetone.

Incorporation of Nanoplatelets into Epoxy Resin

Table 2 lists the recipe for preparing nanocomposite gas barrier films. The nanoplatelets was exfoliated according to the procedure previously described in [0073] using the amount of α-ZrP, M1000 and volume of acetone listed in Table 2. The appropriate amount of Bisphenol F epoxy (EPON 862, Momentive) was dissolved in 5-10 mL of acetone to form a clear solution. The epoxy solution was added dropwise to the stirring α-ZrP dispersion. This dispersion was allowed to stir for 4 h. The solution was concentrated to obtain a 20 wt % solution. The appropriate amount of curing agent W (Epikure W, Momentive) was added to the solution and homogenized by stirring. For weight fraction determination, an aliquot of the solution was taken and subsequently removed of all solvent by rotor-evaporation. The α-ZrP/epoxy mixture was subjected to thermogravimetric analysis (TGA-Q500, TA instruments) where it is heated to 900° C. in air at a heating rate of 20° C. per min and held at 900° C. for 60 min. The solid residue that remains is zirconium pyrophosphate ($ZrP_2O_7$), which can be converted to the equivalent α-ZrP mass fraction via stoichiometric calculations, i.e., mass fraction of $ZrP_2O_7 \times 1.136$=mass fraction of α-ZrP.

TABLE 2

Recipe for preparing nanocomposite gas barrier films.

| Batch | α-ZrP/g | Acetone/ml | M1000/g | Epoxy/g | Curing Agent/g | α-ZrP Weight Fraction |
|---|---|---|---|---|---|---|
| 1 | 0.080 | 5  | 0.265 | 5.381 | 1.420 | 0.008 |
| 2 | 0.267 | 15 | 0.885 | 5.566 | 1.469 | 0.039 |
| 3 | 0.426 | 20 | 1.416 | 4.948 | 1.306 | 0.058 |
| 4 | 0.800 | 40 | 2.655 | 6.096 | 1.609 | 0.069 |
| 5 | 1.173 | 50 | 3.894 | 5.442 | 1.437 | 0.090 |
| 6 | 1.492 | 75 | 4.956 | 3.958 | 1.045 | 0.115 |

Application of Barrier Film onto Substrate Film

The nanocomposite precursor solution was loaded into a spray-gun and sprayed onto a substrate of polyimide (PI) film (Apical, Kaneka) with a thickness of 25 μm. The substrate was sprayed to achieve the desired barrier film thickness. The spray-coated PI film dried in an oven at 40° C. for an hour. The nanocomposite was cured at 120° C. 2 h, 177° C. 4 h and 200° C. 4 h. The thicknesses of the spray-coated films were measured using a dial gauge (Mitutoyo) where an average of six readings was taken.

Evaluation of Gas Barrier Property

Oxygen transmission rate (OTR) of the films were evaluated using a MOCON OX-TRAN 2/21 (MOCON) in accordance to ASTM D3985. OTR at relative humidities of 0%, 50% and 90% were evaluated at 23° C. A total of four spray-coated films were tested. The permeabilities of PI films and PI films coated with neat epoxy by a bar coater were also tested. The permeability of the nanocomposite or epoxy films were obtained from the total permeability of the spray-coated film according to the Equation 1 (Eq. 1) hereinbelow:

$$P_{ILT} = \left(\frac{\phi_c}{P_c} + \frac{\phi_s}{P_s}\right)^{-1} \qquad \text{Eq. 1}$$

where $P_{ILT}$ is the permeability of the spray-coated film, $P_c$ is the permeability of the nanocomposite or epoxy coat, $P_s$ is the permeability of the polyimide substrate. $\theta_c$ is the volume fraction of the nanocomposite or epoxy coat, defined as the ratio of the thickness of nanocomposite or epoxy coat to total thickness, and $\phi_s$ is the volume fraction of the substrate, defined as the ratio of the thickness of substrate to total thickness. The results at 0%, 50% and 90% relative humidity (RH) for coats made from Batch 5 are tabulated in Table 3, Table 4 and Table 5, respectively. The results for Batches 1 to 6 except for Batch 5 tested at 50% RH are tabulated in Table 6. Measurements of two films made from each batch are included

TABLE 3

Oxygen transmission at 0% RH of Batch 5 films.

| RH 0% Sample | Thickness/ μm | Oxygen Transmission Rate (Total film) cc/m² day atm | Permeability, $P_{ILT}$ (Total film) cc mm/m² day atm | Permeability, P (Component only) cc mm/m² day atm | Relative Permeability $P/P_0$ |
|---|---|---|---|---|---|
| Polyimide-1 | 25 | 317.25 | 7.93 | 7.93 | NA |
| Polyimide-2 | 25 | 301.91 | 7.55 | 7.55 | NA |
| Epoxy-1 | 112 | 43.36 | 5.94 | 5.64 | 0.958 |
| Epoxy-2 | 141 | 38.16 | 6.33 | 6.13 | 1.042 |
| Nanocomposite-1 | 8 | 29.17 | 0.96 | 0.26 | 0.043 |
| Nanocomposite-2 | 8 | 20.21 | 0.66 | 0.17 | 0.029 |
| Nanocomposite-3 | 7 | 43.57 | 1.35 | 0.34 | 0.058 |
| Nanocomposite-4 | 6 | 40.23 | 1.28 | 0.26 | 0.048 |

TABLE 4

Oxygen transmission at 50% RH of Batch 5 films

| RH 50% Sample | Thickness/ μm | Oxygen Transmission Rate (Total film) cc/m² day atm | Permeability, $P_{ILT}$ (Total film) cc mm/m² day atm | Permeability, P (Component only) cc mm/m² day atm | Relative Permeability $P/P_0$ |
|---|---|---|---|---|---|
| Polyimide-1 | 25 | 173.16 | 4.33 | 4.33 | NA |
| Polyimide-2 | 25 | 165.28 | 4.13 | 4.13 | NA |
| Epoxy-1 | 112 | 25.98 | 3.56 | 3.44 | 0.955 |
| Epoxy-2 | 141 | 23.04 | 3.82 | 3.76 | 1.045 |
| Nanocomposite-1 | 8 | 15.46 | 0.51 | 0.14 | 0.038 |

TABLE 4-continued

Oxygen transmission at 50% RH of Batch 5 films

| Sample | RH 50% Thickness/ μm | Oxygen Transmission Rate (Total film) cc/m² day atm | Permeability, $P_{ILT}$ (Total film) cc mm/m² day atm | Permeability, P (Component only) cc mm/m² day atm | Relative Permeability $P/P_0$ |
|---|---|---|---|---|---|
| Nanocomposite-2 | 8 | 18.31 | 0.60 | 0.16 | 0.045 |
| Nanocomposite-3 | 7 | 18.87 | 0.60 | 0.15 | 0.041 |
| Nanocomposite-4 | 6 | 21.64 | 0.67 | 0.149 | 0.041 |

TABLE 5

Oxygen transmission at 90% RH of Batch 5 films

| Sample | RH 90% Thickness/ μm | Oxygen Transmission Rate (Total film) cc/m² day atm | Permeability, $P_{ILT}$ (Total film) cc mm/m² day atm | Permeability, P (Component only) cc mm/m² day atm | Relative Permeability $P/P_0$ |
|---|---|---|---|---|---|
| Polyimide-1 | 25 | 134.98 | 3.50 | 3.50 | NA |
| Polyimide-2 | 25 | 134.61 | 3.35 | 3.35 | NA |
| Epoxy-1 | 112 | 22.33 | 3.06 | 2.99 | 0.949 |
| Epoxy-2 | 141 | 20.04 | 3.32 | 3.31 | 1.051 |
| Nanocomposite-1 | 8 | 19.56 | 0.64 | 0.18 | 0.058 |
| Nanocomposite-2 | 8 | 19.27 | 0.63 | 0.18 | 0.057 |
| Nanocomposite-3 | 7 | 16.84 | 0.53 | 0.13 | 0.042 |
| Nanocomposite-4 | 6 | 18.17 | 0.56 | 0.13 | 0.040 |

TABLE 6

Oxygen transmission at 50% RH of Batches 1 to 6 except for Batch 5 films

| Batch-Sample Code | α-ZrP Weight Fraction | RH 50% Thickness/ μm | Oxygen Transmission Rate (Total film) cc/m² day atm | Permeability, $P_{ILT}$ (Total film) cc mm/m² day atm | Permeability, P (Component only) cc mm/m² day atm | Relative Permeability $P/P_0$ |
|---|---|---|---|---|---|---|
| 1-A | 0.008 | 15.4 | 58.20 | 2.35 | 1.37 | 0.380 |
| 1-B | 0.008 | 21.0 | 58.22 | 2.68 | 1.86 | 0.518 |
| 2-A | 0.039 | 19.1 | 51.65 | 2.28 | 1.42 | 0.396 |
| 2-B | 0.039 | 21.2 | 44.57 | 2.06 | 1.28 | 0.357 |
| 3-A | 0.058 | 44.1 | 15.51 | 1.07 | 0.75 | 0.209 |
| 3-B | 0.058 | 32.8 | 19.03 | 1.10 | 0.71 | 0.196 |
| 4-A | 0.069 | 31.3 | 18.37 | 1.04 | 0.65 | 0.180 |
| 4-B | 0.069 | 22.1 | 20.47 | 0.97 | 0.52 | 0.144 |
| 6-A | 0.115 | 13.4 | 14.50 | 0.56 | 0.21 | 0.059 |
| 6-B | 0.115 | 11.1 | 14.82 | 0.53 | 0.18 | 0.050 |

Relative permeability $P/P_0$, is defined as the ratio of the permeability of nanocomposite film P, to the permeability of the neat epoxy $P_0$. The average permeability of two samples of neat epoxy is used to calculate this ratio. The average relative permeability of four nanocomposite films at 0%, 50% and 90% relative humidity (RH) are 0.05, 0.04 and 0.05, respectively. The average absolute permeability of four nanocomposite films at 0%, 50% and 90% RH are 0.26, 0.15 and 0.16 cc mm/m² day atm, respectively.

In terms of relative permeability, the performance of the nanocomposite films is remarkably consistent at high and low humidity levels. In terms of absolute permeability, the performance of the nanocomposite films is consistent within 0.11 cc mm/m² day atm at high and low humidity levels.

Table 6 demonstrates that increasing nanoplatelet concentration results in decreasing permeability of gas molecules, whereby gas barrier property is most effective at weight fractions of 0.09 and above.

Example 3

Preparation of Oligomer-Modified α-ZrP Nanoplatelets in Epoxy Resin

Preparation of Nanoplatelets

ZrP nanoplatelets were prepared according to the procedure described in Example 2, hereinabove Exfoliation and Modification of Nanoplatelets Exfoliation was carried out using M1000. A sample containing 1.5 g of α-ZrP was weighed and dispersed in 75 mL of acetone by sonication for 30 min. A 0.6 gmL$^{-1}$ solution of M1000 in acetone was prepared. A volume of 8.31 mL of M1000 solution was added dropwise to the stirring α-ZrP dispersion. This dispersion was allowed to stir for 4 h. The dispersion was sonicated for 60 min followed by centrifugation at 10,000 rpm for 30 min. The sediment was removed leaving a clear suspension containing only exfoliated α-ZrP and excess polyoxyalkyleneamine. The clear suspension was centrifuged at 20,000 rpm for 2 h and the exfoliated α-ZrP was collected as a gel while the excess polyoxyalkyleneamine remained in the supernatant. The exfoliated α-ZrP was redispersed in 75 mL of acetone.

Incorporation of Nanoplatelets into Epoxy Resin

This procedure yields a nanocomposite with 10 wt % α-ZrP. 7.0 g of Bisphenol F epoxy (EPON 862, Momentive) was dissolved in 12 mL of acetone to form a clear solution. The epoxy solution was added dropwise to the stirring α-ZrP dispersion. This dispersion was allowed to stir for 4 h. The solvent was removed by a rotor-evaporator. 1.86 g of curing agent W (Epikure W, Momentive) was added to the mixture and homogenized by stirring under mild heating. The epoxy mixture was poured into a glass mold and cured at 90° C. 1 h, 120° C. 2 h and 177° C. 2 h under nitrogen atmosphere.

Incorporation of Mesomorphic Structure of Nanoplatelets into Epoxy Thin Film for Enhanced Mechanical Properties;

This procedure yields nanocomposites containing 8.4 wt % and 17.0 wt % of said modified α-ZrP, respectively (samples#7 and #8). The amount of materials used for this section is listed in Table 7. Bisphenol F epoxy resin (EPON 862, Momentive) was dissolved in acetone to form clear solution. Then, this epoxy solution was added dropwise to the said modified α-ZrP dispersion while stirring. This dispersion was allowed to stir for 6 h. The solvent was removed by a rotary-evaporator. Curing agent W (Epikure W, Momentive) was added to the mixture and homogenized by stirring under mild heating. The said modified α-ZrP/epoxy liquid mixture was preheated for 90 mins at 110° C., and then was applied onto a releasing paper (donated by Hexcel). They were followed by successive curing at 90° C. 1 h, 120° C. 1 h, 177° C. 3 h and 190° C. 4 h, to prepare cured epoxy nanocomposites films (samples#7 and #8) with a thickness listed in Table 7. In the meantime, for comparison purposes, cured neat epoxy film with the same epoxy/curing agent ratio, but without said modified nanoplatelets, were prepared as sample #9.

TABLE 7

The materials used to prepare nanocomposites with 8.4 wt %, and 17 wt % of modified α-ZrP, respectively.

| Batch-Sample Code | α-ZrP Weight Fraction | Film Thickness/μm | Epoxy Resin EPON 862/g | Curing agent Epikure W/g | α-ZrP Weight/g |
|---|---|---|---|---|---|
| #7 | 0.084 | 26 | 4 | 1.06 | 0.585 |
| #8 | 0.170 | 23 | 4 | 1.06 | 1.924 |
| #9 | 0 | 28 | 4 | 1.06 | 0 |

Tensile Properties of Cured Nanocomposite with 8.4 Wt % and 17 Wt % of Modified α-ZrP, Respectively.

Figure 11:
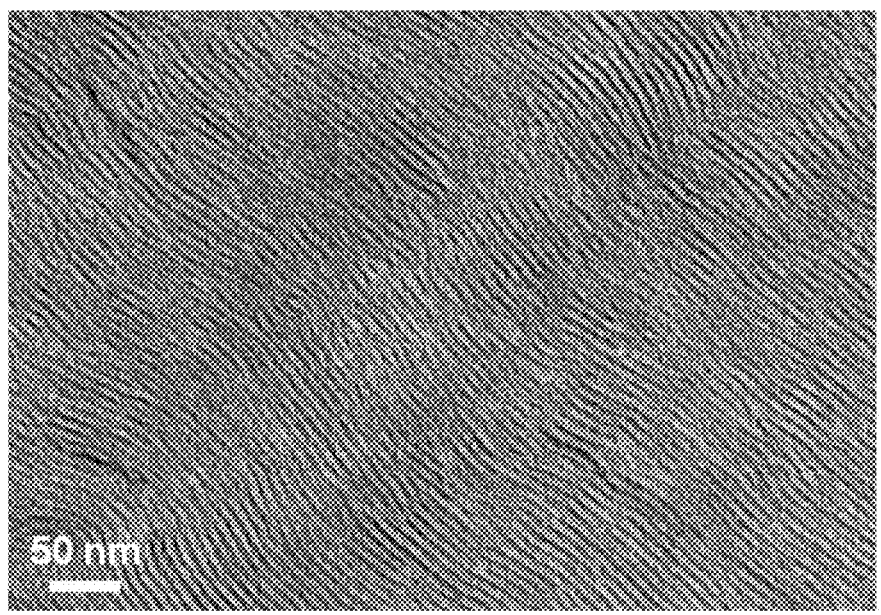
FIG. 11 illustrates a transmission electron micrograph image of nanocomposite film where 17 wt % of said modified α-ZrP nanoplatelets were incorporated in cured epoxy resin.

Tensile properties of cured nanocomposite in Table 7 are summarized in Table 8. Since said oligomer-modified nanoplatelet (B) were self-assembles into mesomorphic structures even in cured epoxy resins, as shown in FIG. 11, mechanical properties of the corresponding nanocomposites results in significant improvement in modulus and tensile strength.

TABLE 8

Tensile properties of cured nanocomposite with modified α-ZrP.

| | Sample #7 | Sample #8 | Sample #9 |
|---|---|---|---|
| Young's modulus, GPa | 8 ± 2 | 22 ± 4 | 2.7 ± 0.4 |
| Tensile strength, MPa | 135 ± 25 | 210 ± 40 | 55.1 ± 5.2 |
| Elongation at break, % | 1.6 ± 0.3 | 0.8 ± 0.2 | 3.8 ± 0.5 |

Example 4

Graphene Oxide Dispersion with Iridescent Behavior

Preparation of Graphene Oxide

First, 0.5 g of graphite powder was added into a 250 mL flask containing 50 mL concentrated $H_2SO_4$ and 0.5 g $NaNO_3$. After stirring for 20 mins, the flask that contains the above solution was submerged in an ice bath and $KMnO_4$ (0.3 g) was slowly added with continuous stirring. After 2 hrs of oxidation, 23 mL of water was heated to 70° C. and slowly added into the mixture. After 30 mins, the reaction was diluted with 70 mL of 70° C. DI water, followed by addition of 10 mL of hydrogen peroxide ($H_2O_2$) to react with excess $KMnO_4$. Next, the mixture was washed with DI water and an aqueous solution that contains 5% HCl many times.

Purification and Exfoliation of Graphene Oxide

Figure 13:
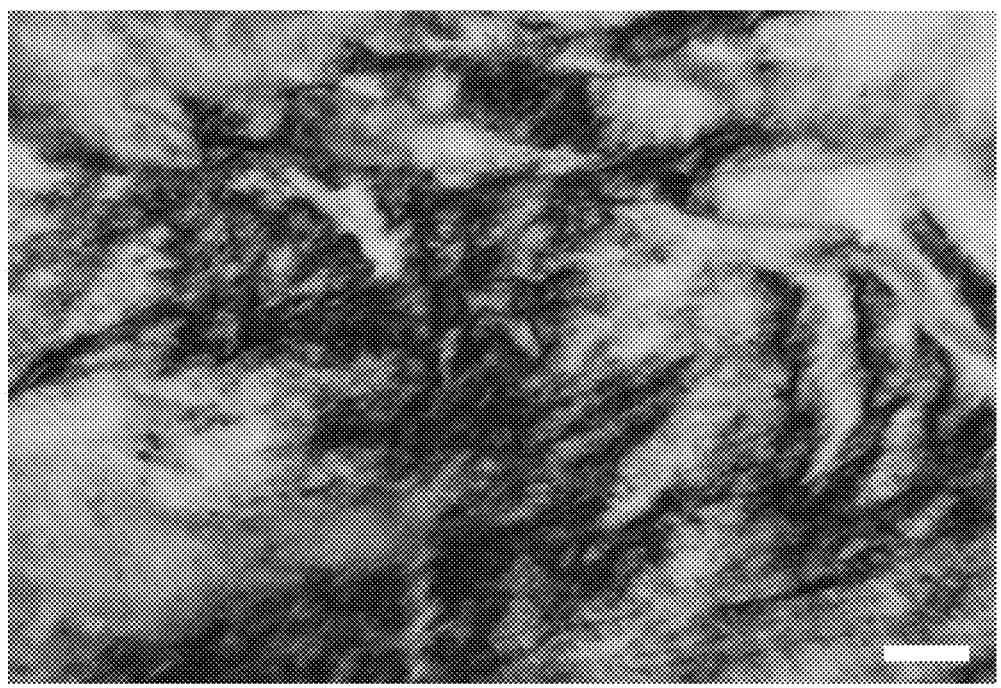
FIG. 13 illustrates a micrograph of a polarized optical microscapy image of graphene oxide nanoplatelets in water (scale bar is 100 µm).
Figure 14:
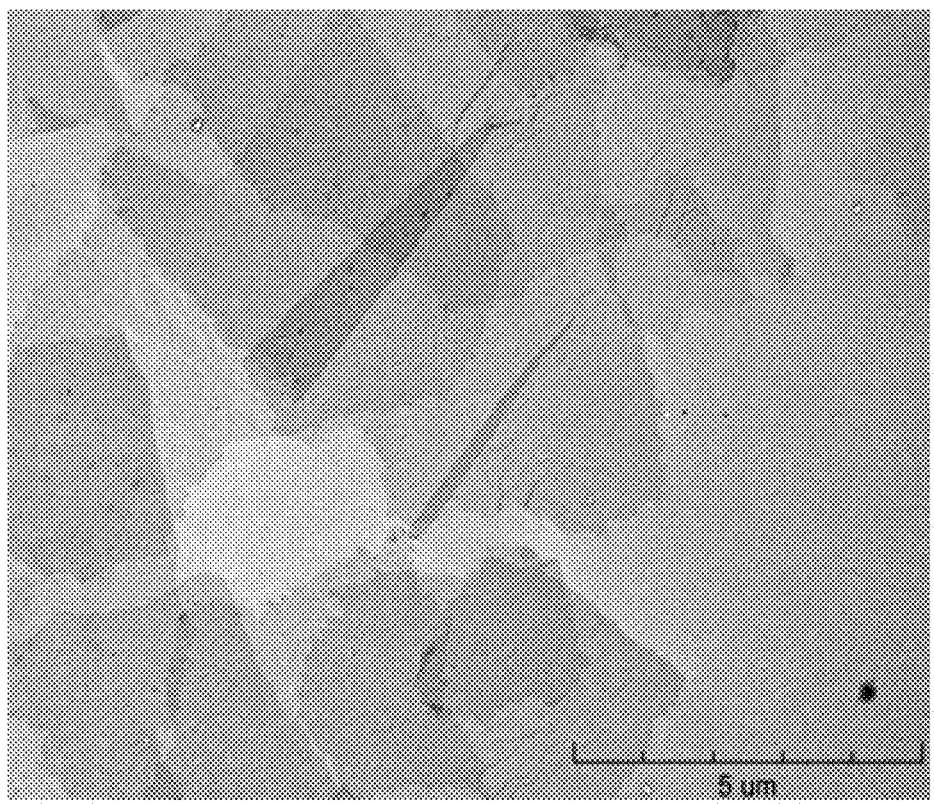
FIG. 14 illustrates a transmission electron micrograph of graphene oxide nanoplatelets FIG. 15 graphically illustrates the TGA result of graphene oxide nanoplatelets and indicates the oxygenated functional groups accounted for 26 wt % on graphene oxide surface.
Figure 15:
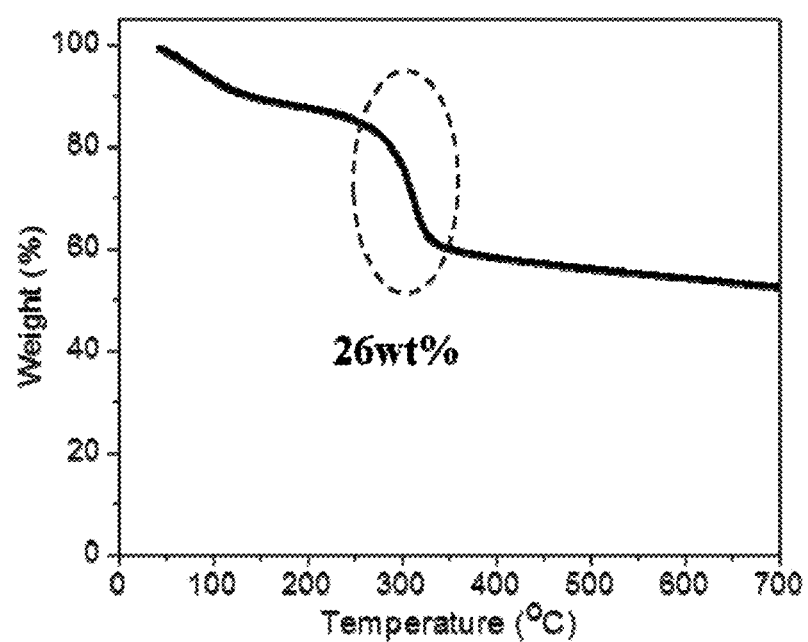

The above graphene oxide after washing was dissolved in aqueous suspension to reach a concentration of 1 mg/mL. The pH value of the graphene oxide dispersion was adjusted to about 3.5 using HCl. After stirring for 10 days, the color of the graphene oxide aqueous dispersion changed from brown to black. After that, it was subjected to centrifugation at 10000 rpm for 60 mins to form graphene oxide gel. The graphene oxide gel was redispersed in an aqueous dispersion to reach a concentration of 1 mg/mL, followed by stirring for 1 day. Subsequently, the dispersion was subjected to mild centrifugation at 3000 rpm for 7 mins to remove any non-exfoliated graphene oxide particles. Afterwards, the aqueous dispersion of exfoliated graphene oxide at a concentration of 0.8 mg/mL was centrifuged at 12000 rpm for 60 mins. The exfoliated graphene oxide was collected as gel and redispersed in water at different concentrations. A typical birefringent feature of graphene oxide aqueous dispersion is shown in FIG. 13. Evidence of graphene oxide with large size is shown in FIG. 14. The final content of the oxygen containing species on graphene oxide accounts for about 26% of the total weight (FIG. 15).

Reflectance Spectroscopy of Graphene Oxide Dispersion

Figure 16:
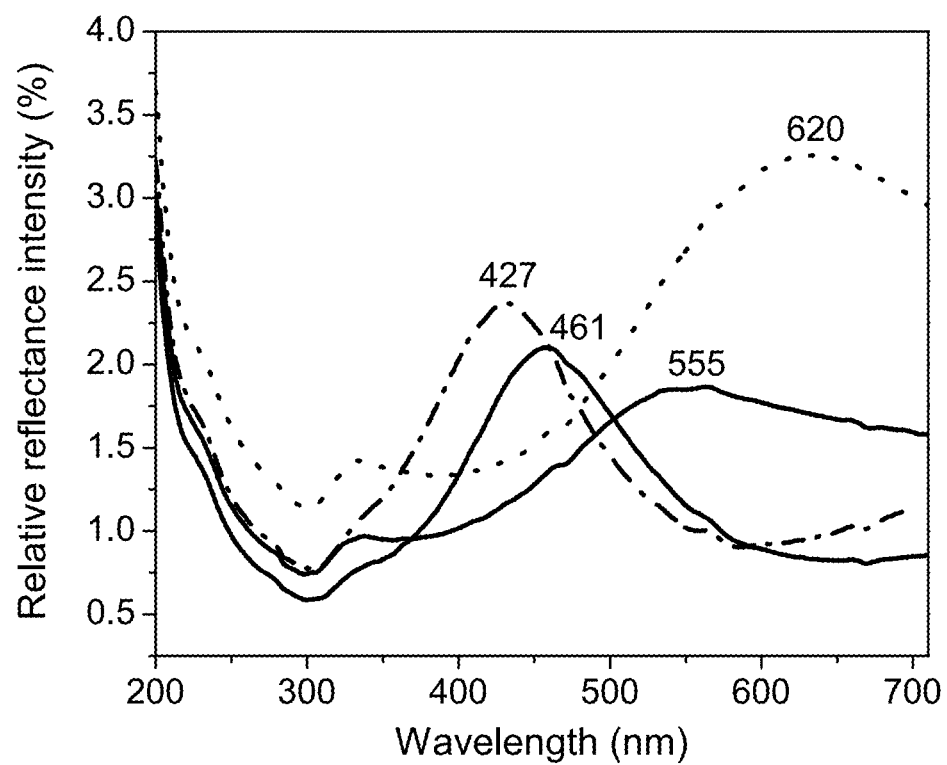
FIG. 16 graphically illustrates the reflectance spectra of graphene oxide nanoplatelets in water with the peak positions labeled for each spectrum.

To demonstrate that color of iridescence changes with graphene oxide concentration, reflectance spectroscopy was performed using a Shimadzu 3600 UV-vis-NIR spectrophotometer (FIG. 16). The graphene oxide dispersions were injected into a cuvette (25.4 mm×15.0 mm×1.3 mm, 2.0 mm optical path length) made from two thin rectangular glass plates (Fisher-Scientific) that were double-sealed by solvent resistant epoxy (PermaPoxy 5 min) and silicone (Loctite RTV 587 Blue). White $BaSO_4$ powder was used as a standard for analyzing the reflectance of the samples.

Example 5

Preparation of Graphene-Based Gas Barrier Films

Preparation of Graphene Oxide was carried out exactly the same fashion as detailed above.

Preparation of Reduced Graphene Oxide

The graphene oxide prepared above were treated with sodium dodecyl benzene sulfonate (SDBS) surfactant by gently stirring 70 mg of graphene oxide in 140 mL 1 wt % SDBS aqueous solution for 4 hrs. Chemical reduction was carried out by adding 70 µL hydrazine. The reaction mixture was heated at 80° C. for 12 hrs under stirring condition. Then, the reduced graphene oxide dispersion in aqueous solution was successfully prepared.

Preparation of Modified Graphene Nanoplatelets

Figure 17:
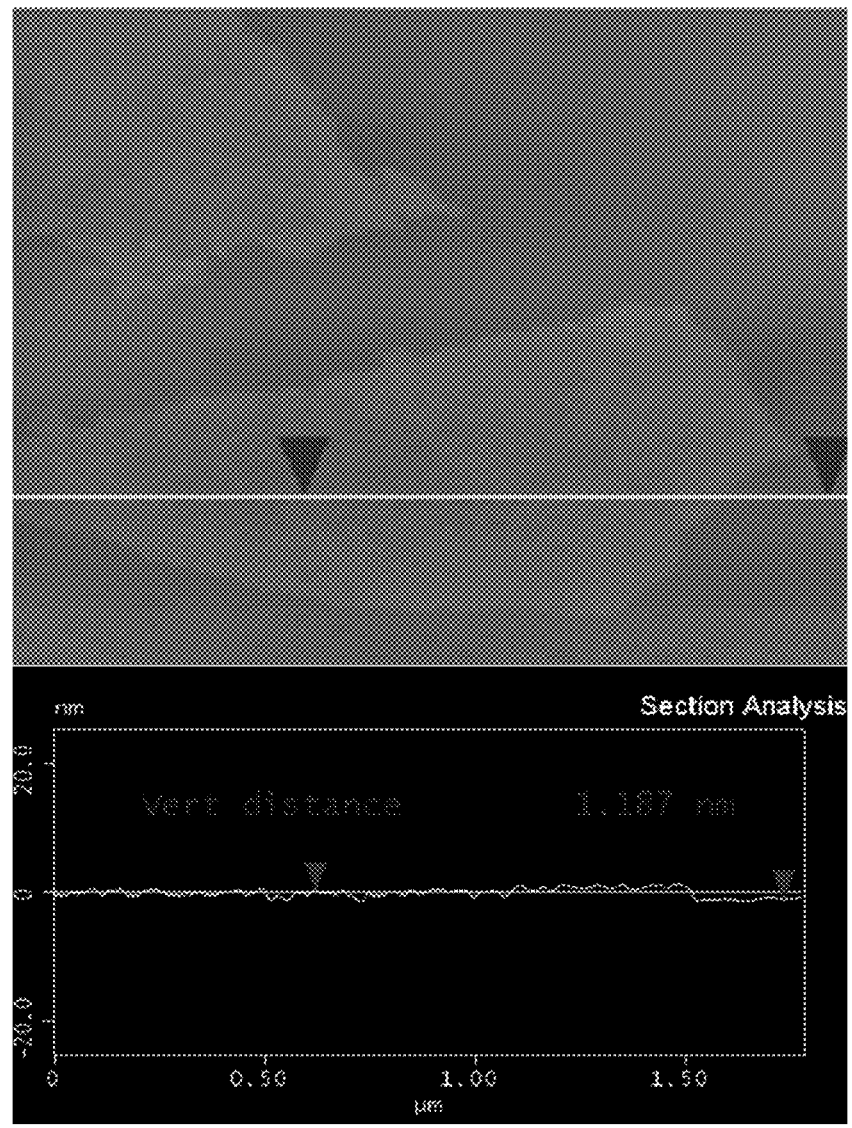
FIG. 17 illustrates an atomic force micrograph (AFM image) of modified graphene in acetone, illustrating solvent-modified graphene sheets are exfoliated.

At first, 3 g nitroaniline was dissolved in 140 mL acetonitrile solvent to achieve a homogenous solution. Then, functionalization of reduced graphene oxide was carried out in a 500 mL three-neck flask, to which 140 mL reduced graphene oxide aqueous solution (0.5 mg/mL) and the above nitroaniline solution were added. Additionally, 3 mL isoamyl nitrite was slowly added dropwise under nitrogen atmosphere. The reaction mixture was heated with stirring to 70° C. for 12 hrs. Afterwards, the suspension was cooled to room temperature. The mixture was filtered and washed with DI water and acetone many times. The resulting modified graphene was redispersed in acetone solvent with a concentration of 0.5 mg/mL. Modified graphene after exfoliation in acetone is shown in FIG. 17.

Incorporation of Modified Graphene into Epoxy Resin

Figure 18:
FIG. 18 illustrates a transmission electron micrograph of solvent-modified graphene in epoxy and indicates that modified graphene oxide sheets are well exfoliated in epoxy matrix.

This procedure yields a nanocomposite with 7 wt % modified graphene oxide. Then, 2.4 g of bisphenol F epoxy (EPON 862, Momentive) were dissolved in 5 mL of acetone to form a clear solution. The epoxy solution was added dropwise to the modified graphene dispersion. This dispersion was allowed to stir for 12 hrs. The solution was concentrated to obtain a 10 wt % solution. Then, 0.634 g of curing agent W (Epikure W, Momentive) was added to the solution and homogenized by stirring. Modified graphene exfoliated in epoxy matrix is shown in FIG. 18.

Application of Barrier Film on Polyimide Substrate

Figure 19:
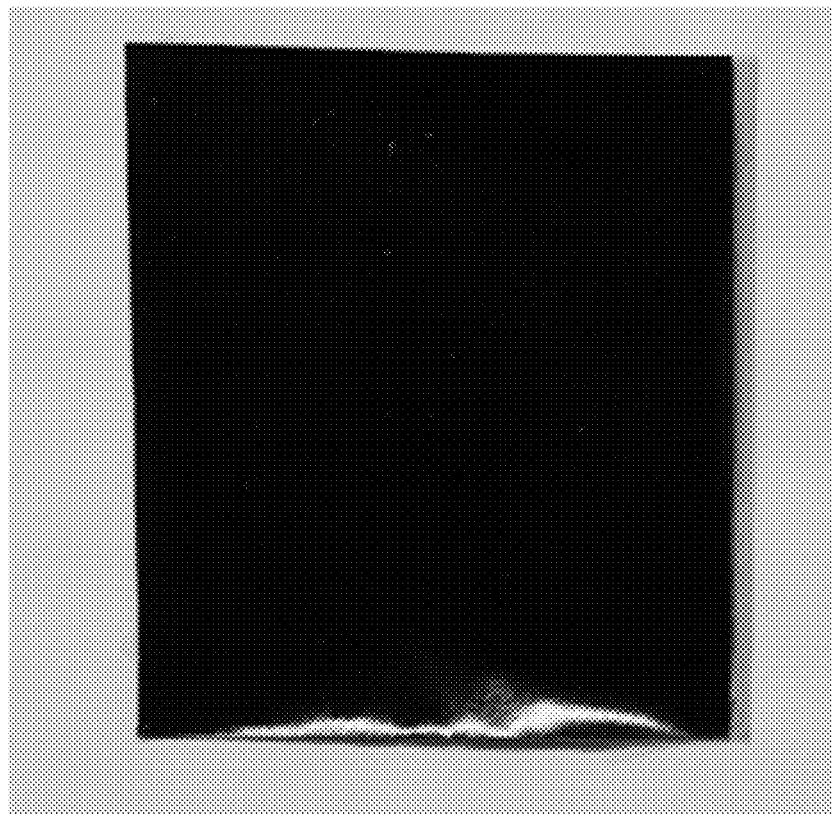
FIG. 19 illustrates a photograph of modified graphene nanocomposites coated on polyimide film via spray-coating method.

The modified graphene nanocomposite solution was loaded into a spray-gun and sprayed onto a substrate of polyimide (PI) film (Apical, Kaneka). The substrate was sprayed multiple times to achieve the desired barrier film thickness. The spray-coated PI film was dried in an oven at 40° C. for 1 hr. The nanocomposite was then cured at 120° C. 2 h, 177° C. 4 h and 200° C. 4 hrs to form the film shown in FIG. 19). The evaluation of its gas barrier properties may be done using a MOCON OX-TRAN 2/21 (MOCON) in accordance to ASTM D3985.

Example 6

Preparation of Graphene-Based Conductive Film

Preparation of Graphene Oxide was prepared the same fashion as indicated above.

Reduced Graphene Oxide was prepared the same fashion as above.

Preparation Of Modified Graphene Nanoplatelets was prepared the same fashion as above.

Incorporation Of Modified Graphene Into Epoxy Resin was prepared the same fashion as above.

Application Of Conductive Film Onto Different Substrates

The modified graphene based on the Examples herein can all be loaded into a spray gun and coat onto a substrate of interest to achieve high surface conductivity. The substrate can be sprayed multiple times to achieve the desired film thickness.

We claim:

1. A nanocomposite, comprising;
   a continuous organic phase comprising at least one selected from the group consisting of an epoxy resin, a urethane resin, and an acrylic resin; and
   a plurality of oligomer-modified nanoplatelets forming a smectic phase of mesomorphic layers in the continuous organic phase, the mesomorphic layers having a d-spacing of from 2 nm to 50 nm;
   wherein the oligomer-modified nanoplatelets are modified by an oligomer having a molecular weight of at least 850 g/mol, and
   the oligomer-modified nanoplatelets comprise at least one inorganic material selected from the group consisting of montmorillonite, bentonite, laponite, a phosphate, a metal oxide, a metal hydroxide, graphene, and graphene oxide.

2. The nanocomposite of claim 1, wherein the oligomer-modified nanoplatelets have a concentration of less than about 30 wt %.

3. The nanocomposite of claim 1, wherein the oligomer comprises at least one of an amine functional group and an amide functional group.

4. The nanocomposite of claim 3, wherein the oligomer comprises polyether monoamine.

5. The nanocomposite of claim 1, wherein the mesomorphic layers are formed such that a Bragg reflection occurs.

6. The nanocomposite of claim 1, further comprising:
   a modifier or a curing agent which comprises at least one of thermal, moisture and radiation curing agents.

7. The nanocomposite of claim 6, wherein the nanocomposite is a spray-coated film produced by a process comprising spray coating a mixture of the continuous organic phase and the modifier or the curing agent.

8. The nanocomposite of claim 6, wherein the nanocomposite is a spray-coated film that has less than about 0.1 relative gas/vapor permeability, P/Po, at 50% RH and 90% RH.

9. The nanocomposite of claim 1, wherein the smectic phase of the mesomorphic layers has a d-spacing of between about 2 nm and about 20 nm.

10. The nanocomposite of claim 9, wherein the mesomorphic layers are formed such that a Bragg reflection occurs.

11. The nanocomposite of claim 9, further comprising:
    a modifier or a curing agent which comprises at least one of thermal, moisture and radiation curing agents.

12. The nanocomposite of claim 1, wherein the nanocomposite is a spray-coated film that has less than about 0.1 relative gas/vapor permeability, P/Po, at 50% RH and 90% RH.

13. The nanocomposite of claim 12, wherein the continuous organic phase is a urethane resin.

14. The nanocomposite of claim 12, wherein the continuous organic phase is an acrylic resin.

15. The nanocomposite of claim 12, wherein the continuous organic phase is an epoxy resin, and the oligomer-modified nanoplatelets comprise modified graphene oxide.

16. The nanocomposite of claim 1, wherein the continuous organic phase is an epoxy resin, and the oligomer-modified nanoplatelets comprise modified graphene oxide.

17. The nanocomposite of claim 1, wherein the nanocomposite of claim 1, wherein the oligomer comprises an amine functional group and an amide functional group.

\* \* \* \* \*